G. F. ALMY.
VEHICLE WHEEL.

No. 186,289. Patented Jan. 16, 1877.

WITNESSES
Henry N. Miller
C. L. Evert

INVENTOR
Geo. F. Almy.
J. H. Alexander
ATTORNEY.

UNITED STATES PATENT OFFICE.

GEORGE F. ALMY, OF DELPHOS, ASSIGNOR TO HIMSELF AND H. M. CLARK, OF TOLEDO, OHIO.

IMPROVEMENT IN VEHICLE-WHEELS.

Specification forming part of Letters Patent No. 186,289, dated January 16, 1877; application filed September 23, 1876.

*To all whom it may concern:*

Be it known that I, GEORGE F. ALMY, of Delphos, in the county of Van Wert and State of Ohio, have invented certain new and useful Improvements in Wheels for Vehicles; and I do hereby declare that the following is a full, clear, and exact description thereof, reference being had to the accompanying drawing, and to the letters of reference marked thereon, which form part of this specification.

My invention relates particularly to wheels for children's carriages, but may be applied to wheels for any vehicle; and has for its object to prevent such wheels from running down into cracks in the sidewalks, into holes, ruts, &c.; and it consists in providing the wheel with one or more guards on one or both sides projecting therefrom a suitable distance inward from the face of the tire, as will be hereinafter more fully set forth.

In order to enable others skilled in the art to which my invention appertains to make and use the same, I will now proceed to describe its construction and operation, referring to the annexed drawing, in which—

Figure 1:
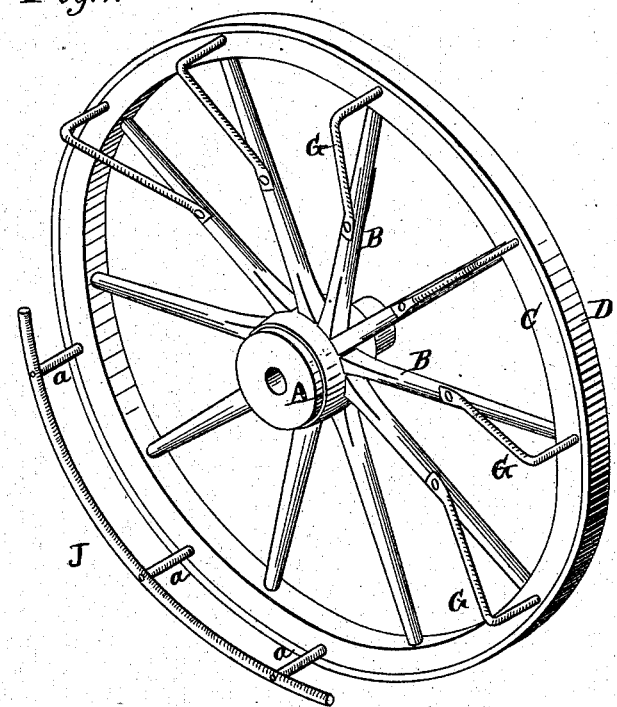
Figure 2:
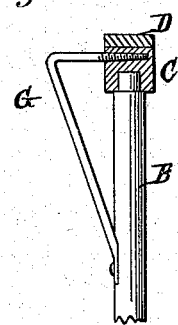

Figure 1 is a perspective view of a wheel embodying my invention. Fig. 2 is a section thereof.

A represents the hub, B B the spokes, C the felly, and D the tire of a wheel for a vehicle of any description, and constructed in any of the known and usual ways. On the side of this wheel I have shown both a series of guards, G G, and also a section of one continuous guard, J, to extend entirely around the wheel. The single guards G are screwed into the felly at one end, and extend a suitable distance outward from the wheel, and then bent so that their other ends can be fastened by screws to the spokes of the wheel. The continuous guard J is held the proper distance from the wheel by means of rods or arms *a a* screwed into the felly and the guard, and the guard then connected to the spokes by braces *b b*.

The object of these guards—whether one or more are used—is to prevent the wheel from sinking down into any crack, hole, rut, or other deep depression; and it is evident that, for this purpose, the construction and mode of attachment of the guards is immaterial, only so that they will project outward from the side of the wheel a suitable distance, and be within the circumference of the tire.

These guards may be used on one or both sides of the wheel, and be fastened to the tire as well as to the felly.

Having thus fully described my invention, what I claim as new, and desire to secure by Letters Patent, is—

A wheel for vehicles, provided with one or more removable metallic guards, connected to the tire or felly, and projecting on one or both sides at suitable distance from the face of the wheel, to prevent the wheel from running into ruts or openings in the ground or pavement, substantially as set forth.

In testimony that I claim the foregoing as my own, I affix my signature in presence of two witnesses.

GEO. F. ALMY.

Witnesses:
B. J. BROTHERTON,
A. C. ALMY.